United States Patent [19]
Kwok et al.

[11] Patent Number: 6,081,337
[45] Date of Patent: Jun. 27, 2000

[54] METHOD AND APPARATUS FOR MEASURING LIQUID CRYSTAL CELL PROPERTIES

[75] Inventors: Hoi-Sing Kwok, Hkust; Shu-Tuen Tang, Shatin, both of The Hong Kong Special Administrative Region of the People's Republic of China

[73] Assignee: The Hong Kong University of Science & Technology, Hong Kong, The Hong Kong Special Administrative Region of the People's Republic of China

[21] Appl. No.: 09/072,558

[22] Filed: May 5, 1998

[51] Int. Cl.[7] .................................................. G01B 11/24
[52] U.S. Cl. .............................. 356/376; 356/36; 356/33; 356/365
[58] Field of Search ................................ 356/376, 36, 33, 356/365

[56] References Cited

U.S. PATENT DOCUMENTS

| | | | |
|---|---|---|---|
| 3,807,862 | 4/1974 | Hatzenbuhler | 356/301 |
| 4,284,354 | 8/1981 | Liao | 356/301 |
| 5,239,365 | 8/1993 | Inoue . | |
| 5,532,823 | 7/1996 | Fukui et al. . | |

*Primary Examiner*—Frank G. Font
*Assistant Examiner*—Reginald A. Ratliff
*Attorney, Agent, or Firm*—Burns, Doane, Swecker & Mathis, L.L.P.

[57] ABSTRACT

The present invention relates to methods and apparatus for measuring the optical properties, eg twist angle, cell gap, input director, of a transmissive or reflective liquid crystal cell. For a transmissive liquid crystal cell the cell is placed between a polarizer and an analyzer and the transmission spectrum observed while rotating the analyzer until zero transmission is obtained at at least one wavelength. The twist angle and the surface rubbing orientations of the liquid crystal cell are determined by the relative angle between the polarizer and the analyzer while the cell gap is determined from the calculated retardation value $d\Delta n$ with known $\Delta n$. For reflective cells cell gap is determined based on a knowledge of twist angle and is accomplished by observing zero reflection wavelengths from a reflective cell with the polarizer and analyzer in cross-orientation.

13 Claims, 6 Drawing Sheets

METHOD AND APPARATUS FOR MEASURING LIQUID CRYSTAL CELL PROPERTIES

FIELD OF THE INVENTION

The present invention deals with two methods for the measurement of the optical properties and characteristics of a liquid crystal cell, in particular the birefringence product $d\Delta n$, cell gap and twist angle, and the direction of the input director of the liquid crystal cell, and the description of apparatus that can perform these new measurement techniques. This invention can also be applied to the measurement of optical thin films with properties similar to liquid crystal layers.

DESCRIPTION OF THE PRIOR ART

Liquid crystal cells are an integral part of any liquid crystal display. In the manufacturing process and in scientific investigations of liquid crystal displays, it is often necessary to measure the cell gap of the liquid crystal cells. There are several existing methods for such measurements. For example, in the interference method, the transmission or reflection spectrum of the glass cell is measured. The peaks and valleys of the spectrum are used to infer the cell gap. In the angular scanning method, the reflectance or transmission of a laser beam is measured as a function of the incident angle. The curve of reflectance versus incident angle will again show peaks and valleys due to interference, and they can be used to infer the cell gap. Both of these methods are based on multiple beam interference. While they are quite convenient to use, and commercial products are available for liquid crystal cell measurements, they suffer from the disadvantage that they are only good for empty cells or with cells filled with isotropic fluid. If an anisotropic medium, or electroactive medium such as liquid crystal is used to fill the cell, these techniques become inaccurate.

The inventions disclosed in U.S. Pat. Nos. 5,532,823 and 5,239,365 provide methods for measuring retardation of a filled twisted liquid crystal cell, and from the retardation value, the liquid crystal cell gap can be calculated. Both methods are ellipsometric measurements taking into account the electroactive properties of the liquid crystal materials. However both of these methods cannot be used to measured the twist angle of the liquid crystal cell, and also they require the twist angle and the liquid crystal directors to be known a priori. In Fukui's method to measure retardation, either the twist angle has to be known or an approximation method which is only good for twist angle less than 120° is used. Thus this method cannot be used with a supertwisted liquid crystal cell. In Inoue's method, twist angle has to be known and the liquid crystal cell is oriented to a specific (45°) angles to the polarizer and analyzer, thus the liquid crystal directors' orientations on substrates have to be known.

In the present invention, we describe methods of using spectroscopic ellipsometry to measure the cell gap and twist angle of liquid crystal cells. These methods are capable of measuring LC cells filled with liquid crystal materials. Our present invention does not require a prior knowledge of the twist angle and the directors' orientations of the liquid crystal cell for transmissive cell. Instead, it is possible using our method to measure both the twist angle and the cell gap of the liquid crystal cell. Moreover, there is no restriction on the value of the twist angle of the liquid crystal cell. Thus, this invention is much more versatile and useful in a general situation where the cell gap and twist angle are both unknown. Furthermore, the reflective cell gap measurement method is the first disclosed method for liquid crystal cell with internal reflector.

SUMMARY OF THE INVENTION

According to the present invention there is provided a method for measuring cell gap thickness birefringence product and twist angle of a transmissive liquid crystal cell, comprising the steps of:

passing a beam from a broad band light source through a linear polarizer, placing a liquid crystal cell under test between said parallel linear polarizer and an analyzer parallel thereto with the cell normal parallel to the incident beam and with the polarizer being at an angle ($\theta_1$) relative to a fixed reference direction;

observing the transmission spectrum while rotating the analyzer clockwise until a null transmission at at least one wavelength is obtained at two angular positions ($\theta_2^{(1)}$, $\theta_2^{(2)}$) relative to the fixed reference direction, one ($\theta_2^{(1)}$) of said null transmission angular positions corresponding to a position in which the null transmission wavelength(s) remains constant upon rotation of said liquid crystal cell, and the other ($\theta_2^{(2)}$) of said null transmission angular positions corresponding to a position in which the corresponding null transmission wavelength(s) ($\lambda_0$) shift upon further rotation of said liquid crystal cell;

calculating the twist angle of the liquid crystal cell by the equation:

$$\phi = \theta_2^{(1)} - \theta_1 \pm \pi/2 \pm \pi$$

and;

calculating the cell gap thickness birefringence product of the liquid crystal cell by the equation:

$$d\Delta n = \lambda_o \sqrt{N^2 - \left(\frac{\phi}{\pi}\right)^2}$$

where N is an integer;

the appropriate value of N and choice of + or − sign being made by calculating the transmission spectra for all combinations and comparing the calculated spectra with the measured one and choosing a best fit.

By means of this arrangement the twist angle can be calculated easily and independently of any other parameters, for example it is quite independent of the chosen reference direction. The produce $d\Delta n$ can be calculated directly and the cell gap can be calculated assuming that the birefringence is known.

In certain situations, in particular if the polarizer and analyzer are parallel when the $\theta_2^{(1)}$ is obtained there may be a ±90° or ±270° ambiguity, in which event the analyzer is rotated clockwise after reaching the null transmission angular position $\theta_1^{(2)}$ and the shifting of the transmission curve is observed, the plus solution being chosen if the curve shifts to the longer wavelength end, and otherwise the minus solution being chosen.

A further aspect of the present invention is that it allows the direction of the input director of the liquid crystal cell relative to the polarizer to be calculated using the formula:

$$\theta_1 = \frac{\theta_2^{(1)} - \theta_2^{(2)}}{2}$$

Viewed from another aspect the present invention provides a method for measuring the cell gap of a reflective liquid crystal cell comprising the steps of:

passing a beam from a broad band light source through a polarizer for providing linearly polarized input light;

placing a liquid crystal cell under test between said polarizer and a cross analyzer with the cell normal parallel to the incident beam;

observing the reflectance spectra while rotating the cell to find an angular position ($\theta_2^{(1)}$) of said cell at which there is null reflectance at at least one wavelength ($\lambda_0$) that does not shift upon further rotation of said cell analyzer;

calculating the cell gap by the equation $$d\Delta n = \lambda_o \sqrt{N^2 - \left(\frac{\phi}{\pi}\right)^2}$$

with known $\Delta n$ and twist angle for N=1 to 3;

and comparing the reflectance curve with simulated curves to uniquely determine the cell gap.

Viewed from another aspect the present invention provides apparatus for measuring optical characteristics of a transmissive liquid crystal cell comprising:

a broad band light source which emits a light beam having a broad spectrum;

an input linear polarizer which linear polarizes the incident light beam;

a rotating analyzer which can rotate about the incident axis;

means for locating a light cell to be tested between and parallel to said polarizer and said analyzer and with the cell normal parallel to the incident beam;

a light collecting and guiding device to collect light passing through the analyzer and to transmit the light to a spectrometer, said spectrometer being adapted to separate the received light and measure the light intensity at various wavelengths; and a real time display device to display the spectrum of the transmitted light.

Viewed from a still further aspect the present invention provides apparatus for measuring optical characteristics of a reflective liquid crystal cell comprising:

a broad band light source which emits a light beam having a broad spectrum;

an input linear polarizer which linear polarizes the incident light beam;

a partial mirror to redirect the light from said light source onto said cell;

a crossed analyzer which allows only light with the same polarization as the incident beam to pass through;

a light collecting and guiding device to collect light passing through the analyzer and to transmit the light to a spectrometer;

a spectrometer which can separate the received light and measure the light intensity at various wavelengths;

a real time display device to display the spectrum of the reflected light.

Viewed from yet another aspect the present invention provides apparatus for measuring optical characteristics of either a transmissive or a reflective liquid crystal cell, comprising:

a first broad band light source which emits a light beam having a broad spectrum;

a first input polarizer which linearly polarizes the incident light beam from said first source;

a rotating analyzer which can rotate about the incident axis;

a second broad band light source which emits a light beam having a broad spectrum at angle normal to said first light source;

a second input polarizer which linearly polarizes the incident light from said second light source;

a partial mirror for reflecting light from said second source along the axis of the light beam emitted from said first source;

means for receiving a liquid crystal cell to be tested between said first input polarizer and said partial mirror such that said cell may receive light either in a transmissive mode from said first source or in a reflective mode from said second source;

a light collecting and guiding device to collect light passing through the analyzer and to transmit the light to a spectrometer, said spectrometer being adapted to separate the received light and measure the light intensity at various wavelengths;

a real time display device to display the spectrum of the transmitted light; and means for selecting the first light source only when the liquid crystal cell is a transmissive cell, and for selecting the second light source only when the liquid crystal cell is a reflective cell.

BRIEF DESCRIPTION OF THE DRAWINGS

These and other objects and features of the present invention will become clear from the following description taken in conjunction with the preferred embodiments thereof with reference to the accompanying drawings in which.

DETAILED DESCRIPTION OF THE PREFERRED EMBODIMENTS

Figure 1:
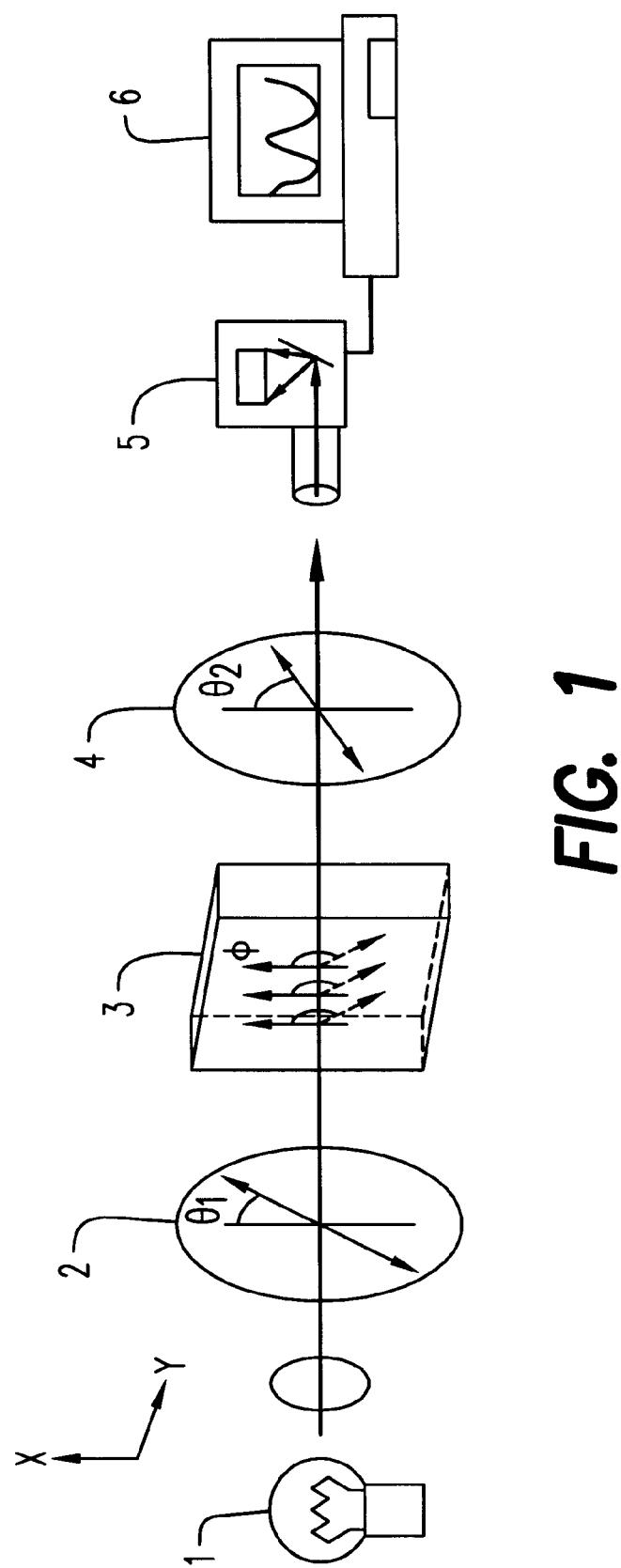
FIG. 1 shows the optical elements and associated coordinates used for the measurement of cell gap and twist angle of an unknown transmissive liquid crystal cell according to an embodiment of the present invention.

This invention is capable of measuring both the twist angle and cell gap (or at least dΔn of a general transmissive liquid crystal cell and the cell gap of a reflective cell. Both the methods of such measurements and the equipment that can be used to effect such measurements will be described below. FIG. 1 shows the optical arrangement that can be used to measure the cell gap and twist angle of a transmissive cell. The apparatus comprises a collimated white light source 1, and a polarizer 2 and a liquid crystal cell 3 under study with a twist angle φ. The input director of the liquid crystal cell is assumed to be parallel to the x-axis, and the polarizer axis makes an angle $\theta_1$ with the x-axis. The apparatus further comprises an analyzer 4 and a spectrometer 5 with a real time display device 6. The analyzer axis makes an angle $\theta_2$ with the x-axis. All angles are measured in a right hand sense clockwise from the x-axis. Thus FIG. 1 illustrates the elements of a measurement system for transmissive cells.

Figure 2:
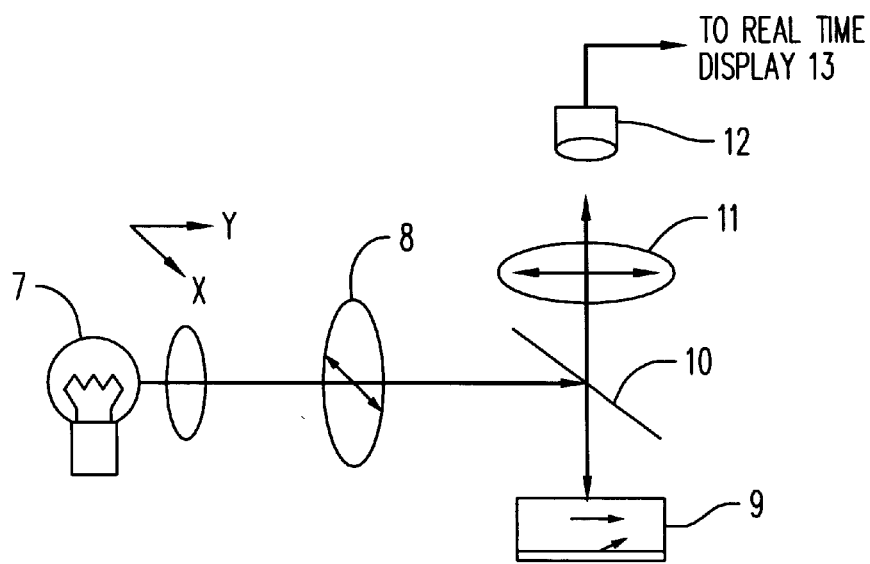
FIG. 2 shows the optical elements for reflective LC cell gap measurement.

FIG. 2 shows the optical arrangement for reflective cell gap measurement. The basic elements are the same as in the transmissive case of FIG. 1, except that a partial mirror 10 is used to redirect the incident linearly polarized light. The procedure of measurement and the specific method of treating the data to obtain the desired results are described below.

In the method of the embodiment of FIG. 1 (the transmissive cell embodiment), linearly polarized light from the collimated light source 1 and the polarizer 2 is incident on the liquid crystal cell 3 and the resultant output light is then incident on the analyzer 4. The analyzer 4 is first made parallel to the polarizer 1, and then rotated clockwise until the transmission spectrum of the light as observed on the display device 6 shows one or several zeros. A zero is defined as a wavelength at which the transmission of the light is near to zero as much as possible. As will be explained below there are generally two analyzer orientations $\theta_2^{(1)}$ and $\theta_2^{(2)}$ such that zero(s) can be observed in the transmission spectrum.

The next step in the procedure is to fix the analyzer at $\theta_2^{(1)}$ and rotate the liquid crystal cell, with the transmission spectrum observed simultaneously. The position of the zero transmission wavelengths are carefully monitored whilst the liquid crystal cell is rotated. The same procedure is repeated with the analyzer fixed at angle $\theta_2^{(2)}$. In general, one of these two analyzer orientations will have a zero transmission wavelength that does not change in value whilst the liquid crystal cell is rotated. The others analyzer position will produce shifts in the zero transmission wavelengths when the liquid crystal cell is rotated. Let us represent the wavelength which has zero transmission that does not shift as the liquid crystal cell is rotated by $\lambda_0$. Let us also represent the corresponding analyzer angle by $\theta_2^{(1)}$. Then the twist angle φ is determined by the formula $$\phi = \theta_2^{(1)} - \theta_1 \pm \frac{\pi}{2} \pm m\pi \quad (1)$$

where m is a positive integer; and the cell gap can be calculated from $\lambda_0$ using the formula:

$$d\Delta n = \lambda_o \sqrt{N^2 - \left(\frac{\phi}{\pi}\right)^2} \quad (2)$$

where d is the cell gap, Δn is the liquid crystal birefringence. N is a positive integer indicates the order of zero transmission, and φ is the LC cell twist angle.

The input director angle relative to the polarizer and analyzer can also be obtained by noting the analyzer angle $\theta_2^{(2)}$ such that the zero transmission wavelengths shift with the rotation of the liquid crystal cell through the relationship $$\theta_1 = \frac{\theta_2^{(1)} - \theta_2^{(2)}}{2} \quad (3)$$

Figure 8:
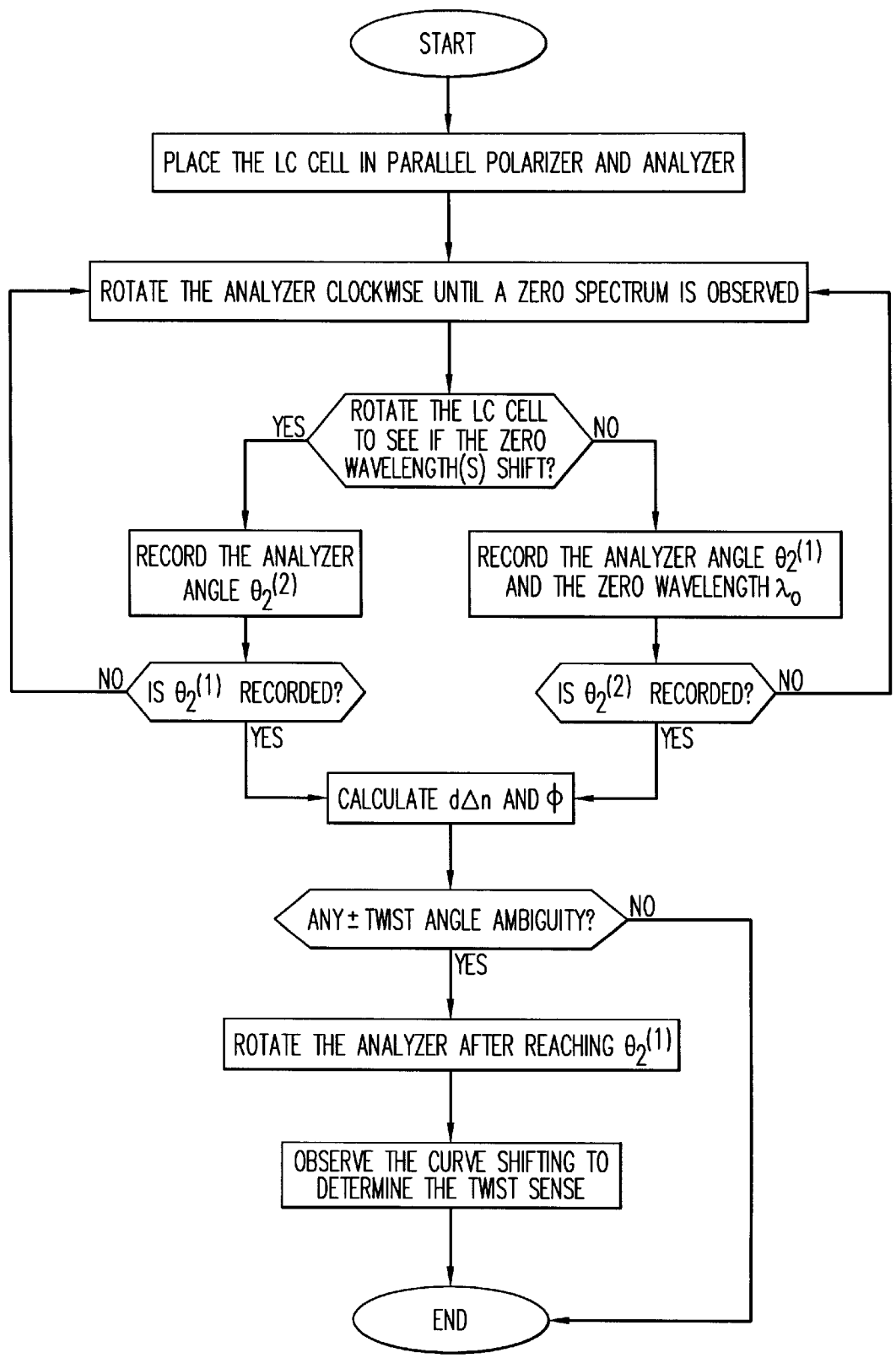
FIG. 8 is a flow chart for showing the procedure to determine the twist angle and cell gap of a transmissive cell according to an embodiment of the present invention.
Figure 9:
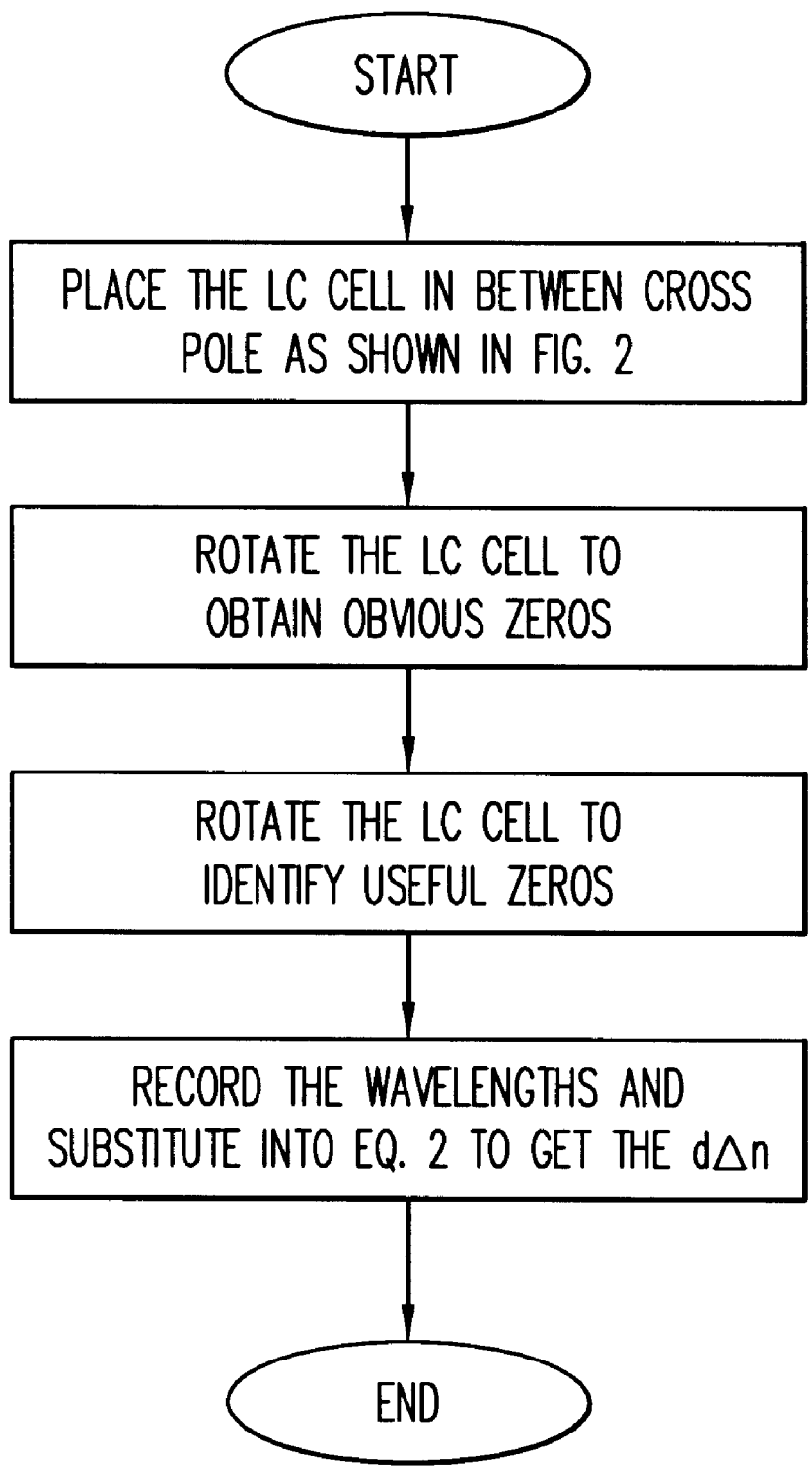
FIG. 9 is a flow chart for showing the procedure to determine the cell gap of a reflective cell according to an embodiment of the present invention.

Therefore, using the above described procedure, the twist angle, the cell gap and the directors' orientations of the unknown liquid crystal cell can be obtained. FIG. 8 is a flowchart that summarises this procedure.

For reflective cells, ie the embodiment of FIG. 2, the procedure is even simpler. The polarizer and analyzer are placed in fixed cross orientation. The reflectance from the reflective LC cell 9 through the analyzer 11 is observed on the real time spectrometer 12 and 13. Usually, there are zeros at certain wavelengths occurred. Of them, some are useful for the calculation and some are not. The cell is rotated to see if the zeros shift. Shifted zeros are not to be used for calculation, while those that do not shift but keep station are recorded as $\lambda_0$. By eq. 2 and the known twist angle φ, retardation dΔn is determined which in turn will give the cell gap for known Δn value.

FIG. 1 describes a first preferred embodiment of the present invention. It illustrates a degenerate optical setup that can be used to obtain the spectrum of the transmitted light. All the optical elements of polarizer 2, analyzer 4 and the liquid crystal cell 3 under study are placed in precision rotary stages. The light beam 1 should be somewhat collimated, even though a non-collimated light beam may work as well, as long as the divergence of the light beam is smaller than a critical value. A spectrometer 5 with display device 6 is used to display in real time the transmitted spectrum through the analyzer 4. The principle of the present invention is explained below with coordinates and element numerals depicted in FIG. 1.

The optical characteristics of the transmitted light through the analyzer 4 can be represented by the Jones matrix equation:

$$T = \left| \begin{pmatrix} \cos\theta_2 & \sin\theta_2 \end{pmatrix} \begin{pmatrix} a+bi & -c+di \\ c+di & a-bi \end{pmatrix} \begin{pmatrix} \cos\theta_1 \\ \sin\theta_1 \end{pmatrix} \right|^2 \quad (4)$$

where $$a = \cos\phi\cos\gamma + \frac{\phi}{\gamma}\sin\phi\sin\gamma \quad (5)$$

$$b = \frac{\beta}{\gamma}\cos\phi\sin\gamma$$

$$c = \sin\phi\cos\gamma - \frac{\phi}{\gamma}\cos\phi\sin\gamma$$

$$d = \frac{\beta}{\gamma}\sin\phi\sin\gamma$$

and $$\phi = \text{twist\_angle} \quad (6)$$
$$\beta = \frac{\pi \cdot d \Delta n}{\lambda}$$
$$\gamma^2 = \beta^2 + \phi^2$$
$$d = \text{cell\_gap}$$
$$\Delta n = \text{birefringence}$$
$$\lambda = \text{wavelength}$$

In eq. (4) $\theta_1$ and $\theta_2$ are the polarizer and analyzer angles relative to the input director of the liquid crystal cell. For a zero in the transmission spectrum to occur, a mathematical solution of eq. (4) will provide the requirement that $$\begin{cases} \cos\gamma\cos(\phi-\alpha_1) + \dfrac{\phi}{\gamma}\sin\gamma\sin(\phi-\alpha_1) = 0 \\ \dfrac{\beta}{\gamma}\sin\gamma\cos(\phi-\alpha_2) = 0 \end{cases} \quad (7)$$

where $\alpha_1 = \theta_2 - \theta_1$ and $\alpha_2 = \theta_2 + \theta_1$.

There are two possible solutions of these 2 equations, $$\text{I} \quad \sin\gamma = 0 \ \& \ \cos(\phi - \alpha_1) = 0 \quad (8)$$

and $$\text{II} \quad \cot\gamma = (\phi/\gamma)\cot 2\theta_1 \ \& \ \cos(\phi - \alpha_2) = 0$$

Eq. (8) implies that there are two analyzer positions $\theta_2^{(1)}$ and $\theta_2^{(2)}$, such that null transmission can be obtained. They are $$\text{I} \quad \theta_2^{(1)} = \phi + \theta_1 \pm \pi/2 \pm m\pi \quad (9)$$

and $$\text{II} \quad \theta_2^{(2)} = \phi - \theta_1 \pm \pi/2 \pm m\pi$$

where m=0, 1, 2, . . .

Solution I corresponds to the case of a zero in the transmission spectrum that does not change in wavelength as the liquid crystal cell 3 is rotated. Thus we can calculate the twist angle and retardation by, $$\phi = \theta_2^{(1)} - \theta_1 \pm \pi/2 \pm \pi \quad (10)$$

and $$d\Delta n = \lambda \sqrt{N^2 - \left(\frac{\phi}{\pi}\right)^2} \quad (11)$$

for $|\phi|<2\pi$, where N is an integer. It is remarkable that $\phi$ is obtained without knowing the absolute value of both $\theta_1$ and $\theta_2^{(1)}$ relative to the input director of the liquid crystal cell. The cell gap can be determined from $d\Delta n$ if the $\Delta n$ value is known. Solution II corresponds to the case where the zero in the transmission spectrum shifts in wavelengths as the liquid crystal cell is rotated. The two analyzer positions in eq. (9) can be used to obtain the input director angle relative to the analyzer and the polarizer, $$\theta_1 = \frac{\theta_2^{(1)} - \theta_2^{(2)}}{2} \quad (12)$$

Thus the direction of the input director can also be determined.

The ambiguities in the + and − sign solution of eq. (10) and the choice of the value of N can be removed by calculating the transmission spectrum using all the possible solutions given by eqs. (10) and (11) and compare it with the measured spectrum. A unique solution of $\phi$ and $d\Delta n$ can always be obtained except when the polarizer and the analyzer are parallel while solution I is obtained. In that case, there will be a ±90° or ±270° ambiguity. In order to solve this ambiguity, the analyzer is rotated in a clockwise direction after reaching the zero transmission solution I, and the shifting direction of the transmission curve is observed. If the curve shifts to the longer wavelength the plus solution is chosen, otherwise the minus solution is chosen.

FIG. 2 is the second preferred embodiment dedicated to reflective cell measurement. The principle of calculation is derived from the description above. The requirement that eq. 4 is equal to zero is just another way to say that the polarization state after passing through the LC layer is linear. This is exactly the necessary and sufficient condition for the reflected light passed through the liquid crystal cell to have the same polarization as the input polarized light. Thus we shall have zero final reflectance for cross pole arrangement.

Figure 4:
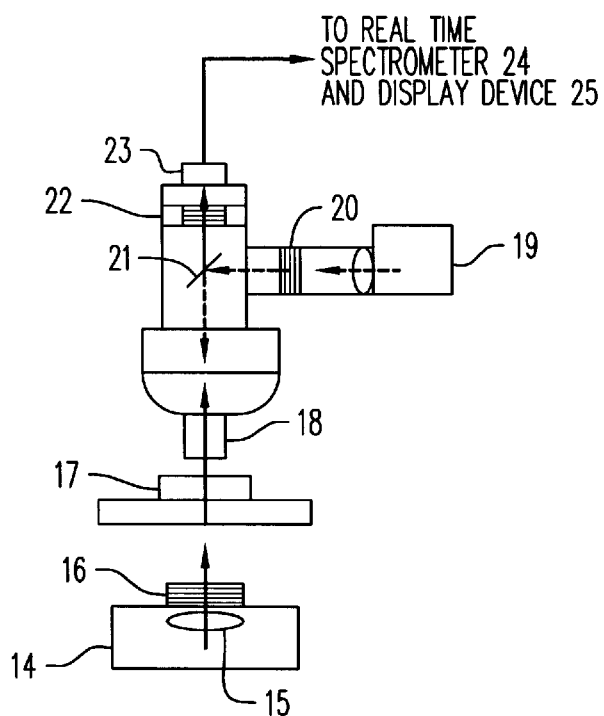
FIG. 4 shows a detailed optical arrangement of a microscopic system for the measurement of the both transmissive and reflective LC cells parameters.

A third preferred embodiment of the present invention is shown in FIG. 4. This embodiment can perform both transmissive and reflective cell measurements. A first broad band light source 14 comprises an incandescent lamp which provides a wide spectrum of light. A condenser 15 is used to focus the light onto an unknown transmission cell 17. A first polarizer 16 is used to make this incident light linearly polarized. A microscope objective 18 is used to collect the light and send it through the microscope system. A rotating analyzer 22 is placed in front of a light collecting optical fiber 23. Then there is a collecting lens to focus light onto the optical fiber. The light guide then transmits the light to the spectrometer 24 which may contain a light separating grating and a CCD as the light detector. The spectrum is then displayed on real time display device 25 such as a computer monitor. If the LC cell is reflective rather than transmissive, a second broad band light source 19 and second polarizer 20 are used. Collimated linearly polarized light from light source 19 is incident on the partial mirror 21, and then is redirected to the microscope objective 18. Focused light is then incident on the reflective liquid crystal cell, and after passing through the liquid crystal layer, the light is reflected by the internal reflector of the cell. It then passes through the objective and the partial mirror and is collected by the optical fiber spectrometer. By using this embodiment, a small region of the liquid crystal cell can be measured.

Figure 3:
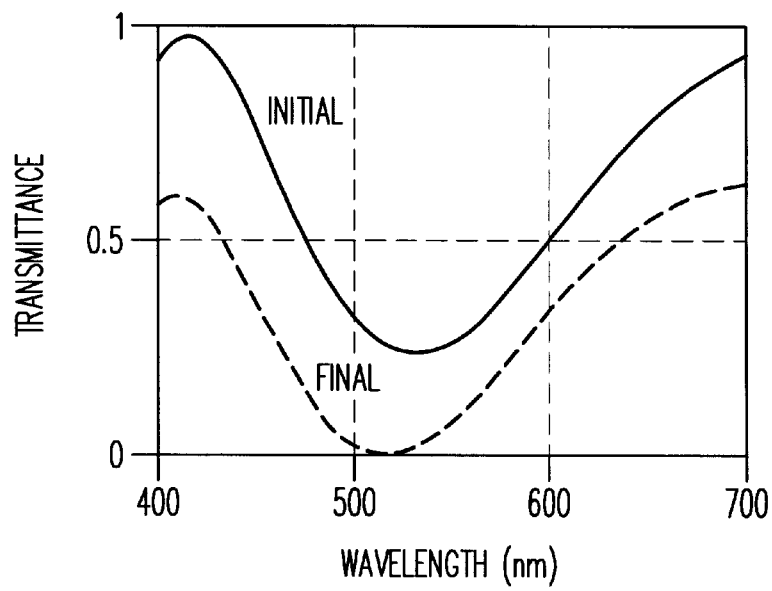
FIG. 3 is a graph illustrating a typical transmission spectrum of the light after passing through the optical system at the beginning of the measurement and the transmission spectrum after a zero has been obtained by rotating the analyzer.
Figure 6:
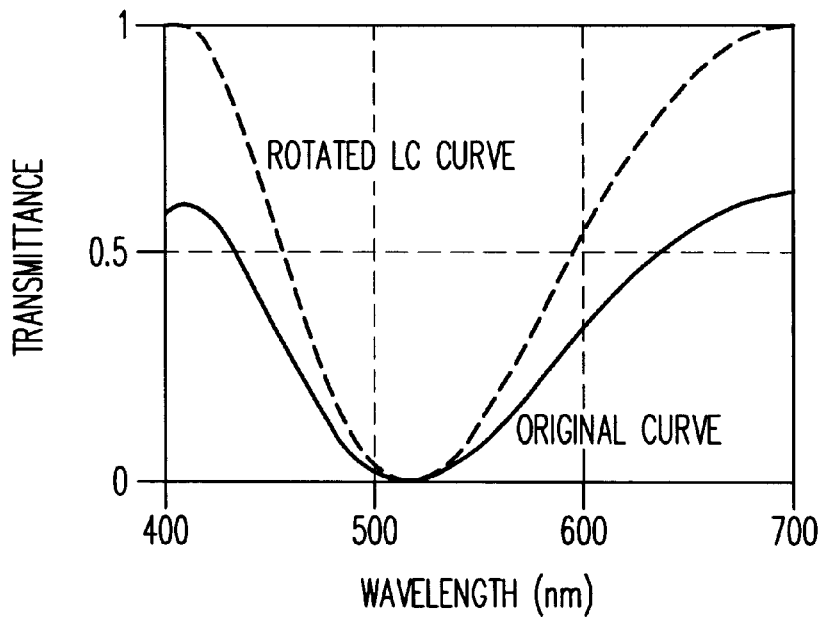
FIG. 6 shows that certain zero wavelengths keep station while the cell is rotating.
Figure 7:
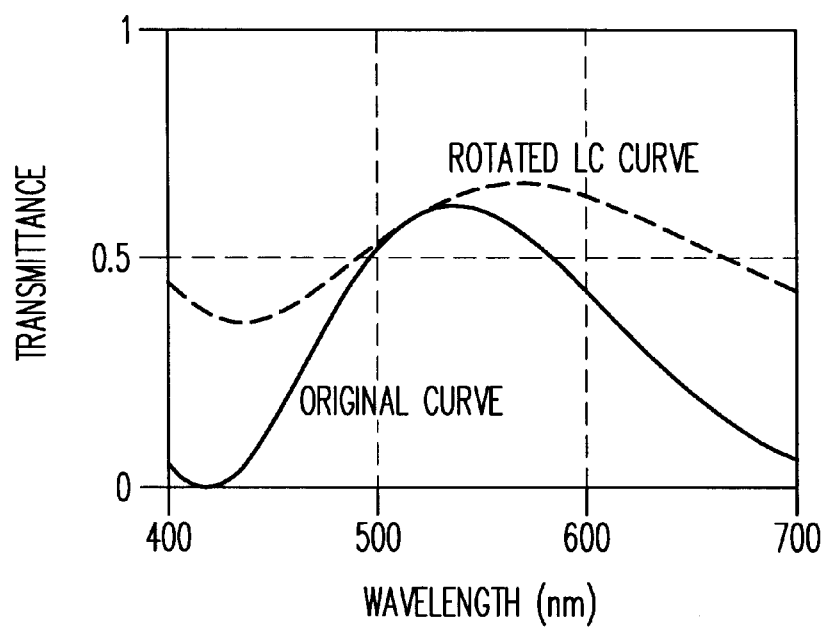
FIG. 7 shows that certain zero wavelengths no longer possess zero value while the cell is rotating.

For a transmissive cell, the spectrum of the transmitted light is observed on the spectrometer in real time as the analyzer 22 is rotated along the axis of the incident light. In the beginning, the spectrum should look quite random with peaks and valleys and the valleys may not reach down to zero transmission, as shown in FIG. 3 solid curve. As the analyzer 22 is rotated, the spectrum will change in shape and eventually, the spectrum will shown one or more points with zero transmission, as shown in the dashed curve of FIG. 3. The liquid crystal cell is then rotated and any shifting of the null wavelength $\lambda_0$ is observed. If the null wavelength remains constant as shown in FIG. 6, then the relative position of the polarizer 16 and analyzer 22, $(\theta_2^{(1)} - \theta_1)$ is recorded, and the null wavelength $\lambda_o$, and the twist angle and cell gap can be calculated by eqs. (10) and (11) with known $\Delta n$. On the other hand, if the null wavelength shift as shown in FIG. 7, the analyzer 22 is rotated again to obtain the other zero spectrum (there are only two possibilities), and then the data record and calculations described above are carried out.

For a reflective cell, the polarizer 20 and analyzer 22 are in cross orientation such that if the liquid crystal cell is replaced by a plane mirror, no light can pass through the analyzer 22. At certain wavelengths, zero reflection will occur naturally. Liquid crystal cell 17 is then rotated to find the stationary zeros. The zero wavelengths are then recorded and the cell gap is calculated by eq. 11 with known $\Delta n$.

Figure 5:
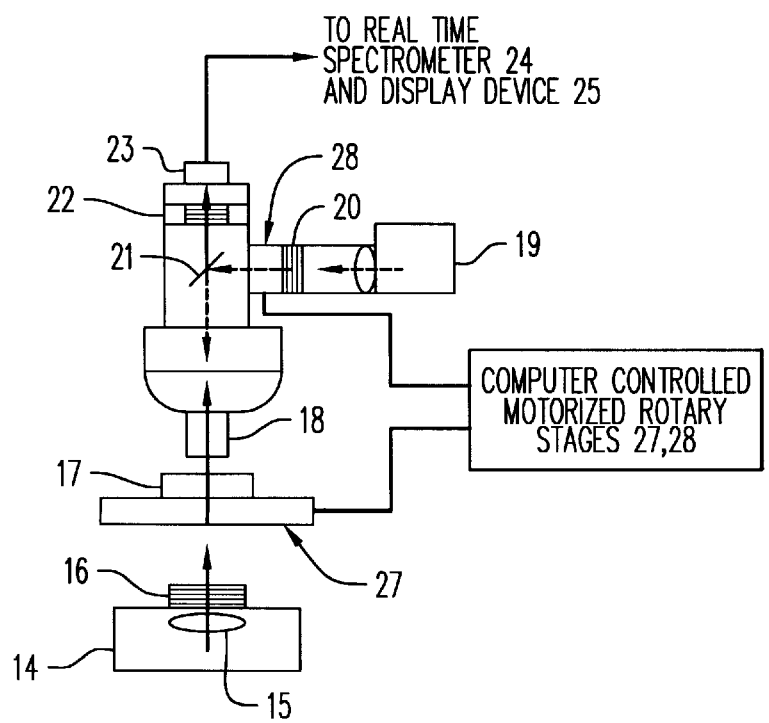
FIG. 5 shows a detailed optical arrangement of a microscopic system with computer controlled motorized rotary stages.

Yet another embodiment of the present invention is shown in FIG. 5. This is substantially the same as the embodiment of FIG. 4 except that the rotation of the analyzer and the liquid crystal cell are automated. Precision computer controlled rotary stages 27 and 28 can be used to control the analyzer angle and the director angle. In this embodiment, the procedures for finding the twist angle and the liquid crystal cell gap are essentially the same. In finding the analyzer angle of the transmissive cell however, the analyzer is first tuned manually to the angle $\theta_2^{(1)}$ where zeros in transmission is observed. Then the machine is allowed to run automatically. The transmission spectrum is measured for many analyzer angles near $\theta_2^{(1)}$. Then an interpolation procedure is used to locate exactly the value of $\theta_2^{(1)}$. This is done by computer control and computer data acquisition. This embodiment should produce a more accurate value of $\theta_1^{(1)}$. The same procedure can be used to determine accurately the value of $\theta_2^{(2)}$.

The invention described above may be embodied in other specific forms without departing from the spirit or essential characteristic thereof. The present embodiments are therefore to be considered in all respects as illustrative but not restrictive, the scope of the invention being indicated by the appended claims rather than by the foregoing description and all changes which come within the meaning and range of equivalency of the claims are therefore to be embraced therein.

What is claimed is:

1. A method for measuring cell gap thickness birefringence product and twist angle of a transmissive liquid crystal cell, comprising the steps of:

passing a beam from a broad band light source through a linear polarizer, placing a liquid crystal cell under test between said parallel linear polarizer and an analyzer parallel thereto with the cell normal parallel to the incident beam and with the polarizer being at an angle ($\theta_1$) relative to a fixed reference direction;

observing the transmission spectrum while rotating the analyzer clockwise until a null transmission at at least one wavelength is obtained at two angular positions ($\theta_2^{(1)}$, $\theta_2^{(2)}$) relative to the fixed reference direction, one ($\theta_2^{(1)}$) of said null transmission angular positions corresponding to a position in which the null transmission wavelength(s) remains constant upon rotation of said liquid crystal cell, and the other ($\theta_2^{(2)}$) of said null transmission angular positions corresponding to a position in which the corresponding null transmission wavelength(s) ($\lambda_o$) shift upon rotation of said liquid crystal cell;

calculating the twist angle of the liquid cell by the equation:

$$\phi = \theta_2^{(1)} - \theta_1 \pm \pi/2 \pm \pi$$

and;

calculating the cell gap thickness birefringence product of the liquid crystal cell by the equation:

$$d\Delta n = \lambda_o \sqrt{N^2 - \left(\frac{\phi}{\pi}\right)^2}$$

where N is an integer;

the appropriate value of N and choice of + or – sign being made by calculating the transmission spectra for all combinations and comparing the calculated spectra with the measured one and choosing a best fit.

2. A method as claimed in claim 1 wherein if there is a ±90° or ±270° ambiguity the analyzer is rotated clockwise after reaching the null transmission angular position $\theta_2^{(1)}$ and the shifting of the transmission curve is observed, the plus solution being chosen if the curve shifts to the longer wavelength end, and otherwise the minus solution being chosen.

3. A method as claimed in claim 1 further comprising the step of calculating the liquid crystal cell gap from above $d\Delta n$ value using a known value of $\Delta n$.

4. A method as claimed in claim 1 further comprising the step of calculating the direction of the input director of the liquid crystal cell relative to the polarizer using the formula:

$$\theta_1 = \frac{\theta_2^{(1)} - \theta_2^{(2)}}{2}.$$

5. A method as claimed in claim 2 further comprising the step of calculating the liquid crystal cell gap from above $d\Delta n$ value using a known value of $\Delta n$.

6. A method as claimed in claim 2 further comprising the step of calculating the direction of the input director of the liquid crystal cell relative to the polarizer using the formula:

$$\theta = \frac{\theta_2^{(1)} - \theta_2^{(2)}}{2}.$$

7. A method for measuring the cell gap of a reflective liquid crystal cell comprising the steps of:

passing a beam from a broad band light source through a polarizer for providing linearly polarized input light;

placing a liquid crystal cell under test between said polarizer and a cross analyzer with the cell normal parallel to the incident beam;

observing the reflectance spectra while rotating the cell to find an angular position ($\theta_2^{(1)}$) of said cell at which there is null reflectance at at least one wavelength ($\lambda_o$) that does not shift upon further rotation of said cell;

calculating the cell gap by the equation $$d\Delta n = \lambda_o \sqrt{N^2 - \left(\frac{\phi}{\pi}\right)^2}$$

with known $\Delta n$ and twist angle for N=1 to 3;

and comparing the reflectance curve with simulated curves to uniquely determine the cell gap.

8. Apparatus for measuring optical characteristics of either a transmissive or a reflective liquid crystal cell, comprising:

a first broad band light source which emits a light beam having a broad spectrum;

a first input polarizer which linearly polarizes the incident light beam from said first source;

a rotating analyzer which can rotate about the incidence axis;

a second broad band light source which emits a light beam having a broad spectrum at angle normal to said first light source;

a second input polarizer which linearly polarizes the incident light from said second light source;

a partial mirror for reflecting light from said second source along the axis of the light beam emitted from said first source;

means for receiving a liquid crystal cell to be tested between said first input polarizer and said partial mirror such that said cell may receive light either in a transmissive mode from said first source or in a reflective mode from said second source;

a light collecting and guiding device to collect light passing through the analyzer and to transmit the light to a spectrometer, said spectrometer being adapted to separate the received light and measure the light intensity at various wavelengths;

a real time display device to display the spectrum of the transmitted light; and means for selecting the first light source only when the liquid crystal cell is a transmissive cell, and for selecting the second light source only when the liquid crystal cell is a reflective cell.

9. Apparatus as claimed in claim 8 further comprising means programmed to calculate the twist angle and cell gap according to the equations $$\Phi = \theta_2^{(1)} - \theta_1 \pm \pi/2 \pm \pi$$

and $$d\Delta n = \lambda_0 \sqrt{N^2 - (\Phi/\pi)^2}$$

with data obtained.

10. Apparatus as claimed in claim 9 further comprising means programmed to calculate the input director direction, and hence the surface rubbing directions on the liquid crystal cell relative to the polarizer direction, according to the equation:

$$\theta_1 = \frac{\theta_2^{(1)} - \theta_2^{(2)}}{2}$$

with data obtained.

11. Apparatus as claimed in claim 8 further comprising means whereby the rotation of the analyzer or the liquid crystal cell is effected by computer controlled rotary stages.

12. Apparatus as claimed in claim 8 wherein the apparatus is part of a microscope, with the liquid crystal cell under test placed in focus of the microscope objective.

13. A method for measuring the optical properties of a transmissive or reflective liquid crystal cell or of a thin film, comprising placing said cell or thin film in an optical path between a source of broad band polarized light and an analyzer, rotating said analyzer or said cell or thin film until a null transmission or reflectance at at least one wavelength is observed which null transmission does not shift upon rotation of said cell or thin film and measuring the angle of said analyzer or said cell or thin film relative to the polarization of said light at which such null transmission is observed, and calculating desired optical properties of said cell or thin film from said measured angle and known parameters of said cell or thin film.

* * * * *